Patented Aug. 9, 1932

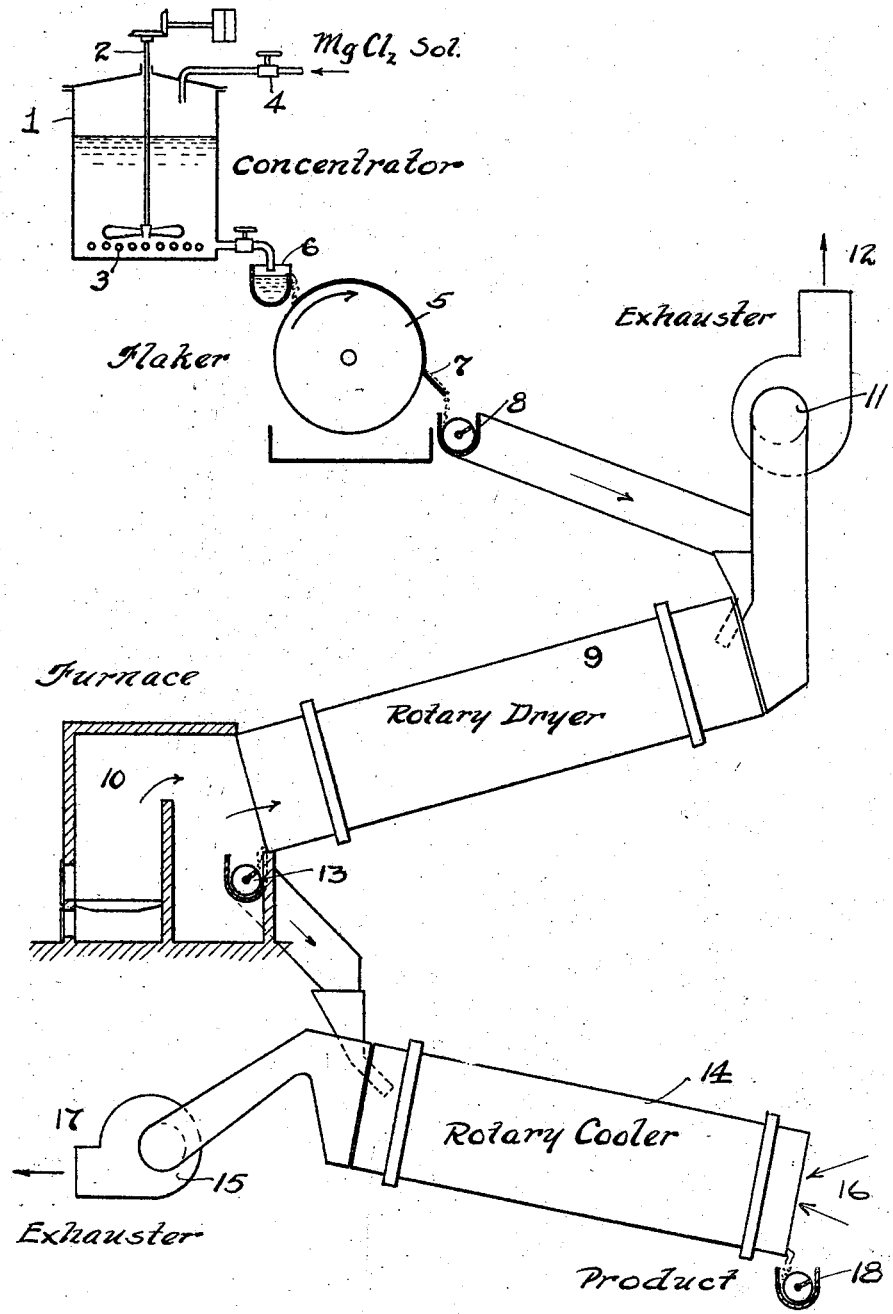

1,871,411

UNITED STATES PATENT OFFICE

SHELDON B. HEATH, OF MIDLAND, MICHIGAN, ASSIGNOR TO THE DOW CHEMICAL COMPANY, OF MIDLAND, MICHIGAN, A CORPORATION OF MICHIGAN

METHOD OF PREPARING PARTIALLY DEHYDRATED MAGNESIUM CHLORIDE

Application filed March 19, 1929. Serial No. 348,178.

The invention relates to improvements in the manufacture of metallic compounds, normally containing water of crystallization, in a partially dehydrated, divided, noncoalescent form whereby the particles so obtained exhibit free-flowing characteristics and a reduced tendency to cake or solidify in the container or package.

Generally speaking, compounds of the character in hand can exist in one or more solid hydrated forms containing water of crystallization and are further characterized as being deliquescent substances readily attracting moisture from the air and dissolving easily in water. Such substances on account of their high degree of solubility do not crystallize readily from their aqueous solutions and can be crystallized then only from relatively concentrated solutions. The product so obtained consists of crystals having the surfaces thereof wetted with the concentrated mother liquor. Unless this adhering mother liquor is removed the crystals upon standing soon cake or coalesce into a more or less solid mass, often difficult to break up. For obtaining a pure crystalline product in divided form which can be stored in suitable containers or packages without caking or solidifying, it is important to separate the crystals as completely as possible from any adhering mother liquor. Washing with water accomplishes this result more or less completely, but at the expense of redissolving a considerable proportion of the crystals themselves. Ordinary drying methods in most cases cannot be used without danger of fusing the crystals together into a solid mass.

One method of processing a substance of the present character, as specifically applied to calcium chloride or magnesium chloride, is described in U. S. Patent 1,527,121 to Cottringer and Collings. Briefly described, the method consists in concentrating a solution of the salt at an elevated temperature such that upon cooling the so concentrated solution is capable of setting into a solid, or at least semisolid, mass; causing the fused material to flow on to the periphery of a revolving drum cooled so as to chill a solidified layer of the substance upon the surface thereof; scraping the solidified layer off in the form of flakes; kiln-drying the product and then cooling the current of air, whereby the individual flakes are superficially dried or dehydrated further to the point where their inherent tendency to coalesce is materially reduced. The product so obtained is a partially dehyrated divided or comminuted form of the normal hydrated salt.

The present invention comprises an improvement upon the above described method of working whereby a divided or comminuted product having a lower content of water of crystallization is obtained, such product possessing to an increased degree the desired free-flowing and non-caking characteristics, the particles also being harder and stronger and thereby less susceptible to crumbling or powdering when handled.

A further advantage lies in the fact that the particles may be prepared by a flaking process wherein the solidified film formed on the surface of the flaker drum is more easily and cleanly detached therefrom by the scraper knives than by the method as at present employed.

To the accomplishment of the foregoing and related ends, the invention, then, consists of the steps and new products hereinafter fully described and particularly pointed out in the claims, the annexed drawing and following description setting forth certain detailed procedures embodying the invention, these being illustrative, however, of but a few of the various ways in which the principle of my invention may be applied.

In said annexed drawing:

The single figure there appearing illustrates in diagrammatic fashion an apparatus arranged for the carrying out of my improved process or method.

In general a material may be flaked in the manner already described if it can be prepared by evaporation of its solution to a fluid or semi-fluid mass of such composition that, upon cooling, complete solidification thereof will occur at a temperature materially above normal atmospheric temperature. When such fluid material is applied in a thin film to the cooled surface of a revolving flaker drum, the film solidifies so that it can be scraped off as well-defined flakes. The higher the solidification temperature thereof, the more easily and rapidly is the operation performed.

The usual practice has been to carry the preliminary evaporation of the solution to be flaked only so far as to maintain a clear liquid at the boiling temperature, and it has been thought advisable to stop the concentration short of the point where any material precipitation of solid crystals takes place. I have found, in some cases, that the solidified film formed by chilling such clear solution on a flaker drum is tough and rubbery, adhering tightly to the drum, so that it can not be easily detached, and furthermore is not sufficiently hard and brittle to break off cleanly in flakes of regular and definite form. At times and with certain materials the difficulties involved in producing a satisfactory flake product are of very material consequence.

I have now found that difficulties of the sort just mentioned may be largely avoided if the solution to be flaked contains in appreciable amount solid crystalline particles held in suspension therein. The presence of such particles in the solidified film as it is formed upon the surface of the flaker drum serves to alter or modify the character of the film, imparting to it greater hardness and brittleness and also, apparently, accelerating somewhat the rate of solidification. To obtain the requisite suspension of solid crystalline particles I carry the concentration of the solution further than has been the practice previously and, indeed, to the point where a material precipitation of crystals takes place therein, either at the temperature of evaporation or when cooled to a certain lower temperature above the solidifying point of the concentrated solution. In other words, the concentration is caused to proceed beyond the point of saturation of the dissolved constituent or of at least one of the dissolved constituents, should more than one be present, at some temperature above that at which the mass will solidify. Proceeding in this way I obtain a slurry, or magma, of precipitated crystals and hot mother liquor, the consistency of which is preferably so regulated, by controlling the amount of crystallization, that it may be conveniently pumped through pipes from the concentrating vessel to the flaking apparatus in the usual way.

Other advantages also accrue as a result of my improved method of procedure. Obviously the flake product so made contains a higher percentage by weight of the essential constituent. Another advantage is that certain products can be conveniently prepared in flake form which cannot readily be so made if it is attempted to flake a clear solution thereof.

Furthermore it is frequently of advantage to concentrate under vacuum, whereby a lower final temperature suffices to give the same degree of concentration. Under such procedure, however, the solubility of the dissolved substance in the mother liquor is proportionately lowered and a greater or lesser quantity of crystals is precipitated. By making a crystal slurry in this way and flaking such slurry, instead of flaking a clear solution of equal concentration, which could be obtained only by evaporating at a higher temperature and correspondingly higher pressure, a notable economy in operation is realized. Concurrently, such procedure often results in lessened wear and tear and corrosion on the evaporating equipment, due to operating at a lower temperature.

Taking calcium chloride as an example of a product of the type herein referred to, this salt is now manufactured commercially in large quantity by concentrating a solution thereof to a content of from 71 to 75 per cent. of the anhydrous salt and then flaking and drying in accordance with the patented procedure previously described. The flaked product so obtained contains somewhat less water of crystallization than corresponds to the dihydrated salt $CaCl_2.2H_2O$, corresponding to about 75 per cent. anhydrous $CaCl_2$, or slightly less.

For proceeding in accordance with the present invention, I concentrate a solution of calcium chloride to a temperature of 177° to 178° C. at atmospheric pressure, whereupon continued evaporation results in salting out crystals of calcium chloride monohydrate, $CaCl_2.H_2O$, forming a slurry thereof with the hot mother liquor, which is then flaked in the usual way. The concentrated solution exhibits a propensity to become superheated if evaporated rapidly, so that the temperature during the salting out of the monohydrate crystals may rise to as high as 186° C. if the rate of evaporation is sufficiently high. The slurry has a very sharp freezing point and will solidify at a temperature above 170° to form hard strong particles. A slurry having a consistency such that it can be pumped readily from the concentrator to the flaker will produce a flake containing about 77 per cent. anhydrous calcium chloride, which may then be superficially dried and cooled as already described.

My preferred method of procedure is indicated in the accompanying drawing in which 1 represents a concentrating kettle provided with an agitator 2 and heating coils 3. Calcium chloride solution is fed in by way of pipe 4. Concentration in this kettle is either continuous or by batches as preferred, there being formed therein a slurry of mother liquor and crystals of calcium chloride monohydrate $CaCl_2.H_2O$. This slurry will be preferably as thick as can be pumped to the flaker 5 and it may be either fed directly into the pan of the flaker or distributed upon the drum by means of a suitable spreading device indicated at 6. The revolving flaker drum 5 is cooled in the ordinary way and there is formed thereon a thin solidified film of the chloride which is scraped off by the knife 7 and delivered to the conveyor 8 and thence to the dryer 9 shown as of the rotary kiln type. The latter is preferably provided with internal shovels for lifting and dropping the flakes through a heated gaseous current derived from the combustion of fuel in the connected furnace 10, such heated gaseous current being drawn through the dryer by the exhauster 11 and discharged at 12. The hot superficially dried flakes are discharged from the dryer 9 to conveyor 13 which delivers them to the cooler 14, here shown as of similar construction to the dryer. A current of air is drawn through the cooler by the exhauster fan 15, in the direction as indicated by the arrows at 16 and 17. The dried and cooled flakes are discharged to the conveyor 18 to be delivered to the packaging or other further step in the treatment.

The product from the flaker so obtained, contains, as previously pointed out, a higher percentage of anhydrous $CaCl_2$, than that prepared by present methods, i. e. 77 per cent as compared with from 71 to 75 per cent $CaCl_2$. It consists essentially of a conglomerate of crystals of the monohydrate, $CaCl_2.H_2O$, in a matrix of the solidified mother liquor composed substantially of the dihydrate $CaCl_2.2H_2O$. The drying operation has the effect of reducing the water content of the surfaces of the individual particles below the average for the product as originally formed. The flakes are mechanically stronger and make less dust in the drying operation and subsequent handling than the former product, and have less tendency to coalesce and cake in the package.

By similar procedure partially dehydrated forms of magnesium chloride may be prepared. As is known, the normal crystalline form of this compound has the composition $MgCl_2.6H_2O$. A solution thereof having such composition is obtained by concentrating to a temperature of 160° C. at atmospheric pressure, and may be flaked in the usual way by cooling below its freezing point, i. e. 117° C. If the concentration is continued with increase of temperature to 170° C. at atmospheric pressure the fused mass then contains about 50 per cent. $MgCl_2$, therefore containing somewhat less crystal water than corresponds to the formula $MgCl_2.6H_2O$. At this temperature no material deposition of crystals takes place, but if the solution is cooled to about 140° to 150° C. an abundant precipitation of crystals of the composition $MgCl_2.4H_2O$ is obtained, forming a slurry thereof with the hot mother liquor. When the clear hot solution at 170° C. is flaked immediately, a more or less elastic film is formed on the flaker drum which adheres firmly and is very difficult to scrape off. When the solution is first cooled to 140° to 150°, thereby forming a slurry as above described, and the slurry is then spread on the surface of the flaker drum, a hard, brittle film is solidified thereon which is easily detached and forms well-defined flakes of uniform size constituting a very superior product.

Instead of concentrating the magnesium chloride solution at atmospheric pressure, the step may be conducted under sub-atmospheric pressure at a lower temperature with less corrosion of the equipment. For example, by concentrating under sub-atmospheric pressure to saturation at approximately 140° C. and then continuing evaporation at that temperature, a quantity of crystals of the $4H_2O$ salt is precipitated to form a slurry similar to that mentioned above, which may then be flaked with equal facility.

When the concentration of the magnesium chloride solution is carried still further to a boiling point of 193° C. under atmospheric pressure, it attains a composition corresponding to the tetra-hydrate, $MgCl_2.4H_2O$, the freezing point of which is 180° C. By concentrating under reduced pressure at temperatures between 180° and 193° C. or by continued evaporation at 193° C. at atmospheric pressure, a quantity of crystals of the dihydrate $MgCl_2.2H_2O$ is precipitated, forming a slurry which may likewise be flaked advantageously.

While I have described my invention as being particularly applicable to the preparation of a flake product, the advantages inherent in the method of treating a crystal slurry are very apparently of equal applicability to other methods of forming materials of the character described in divided, comminuted form wherein a suitable slurry is treated to produce directly discrete solid particles thereof. For example, a more or less spherical or granular divided form of product may be made by spraying the slurry from a rapidly revolving disc or by forcing it under pressure from an orifice, or by similar methods.

In the following claims, slurry is used to mean a fluid mixture of mother liquor and crystals in suspension therein, having a consistency such that it may be pumped or otherwise handled by means similar to those commonly employed for handling or transferring liquids.

The method herein described, as applied to calcium chloride, is claimed in my co-pending application Serial No. 343,961, filed March 2, 1929, now Patent No. 1,851,309. In the present application the claims are directed specifically to the preparation of a magnesium chloride product in accordance with the procedure as set forth, wherein the concentration of the original solution is carried out under reduced pressure.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of preparing hydrated magnesium chloride containing less water of crystallization than corresponds to the formula $MgCl_2.6H_2O$, the steps which consist in concentrating a solution of magnesium chloride under sub-atmospheric pressure to form a slurry composed of crystals of the composition $MgCl_2.4H_2O$ and the mother liquor thereof, and flaking said slurry.

2. In a method of preparing hydrated magnesium chloride containing less water of crystallization than corresponds to the formula $MgCl_2.6H_2O$, the steps which consist in concentrating a solution of magnesium chloride under sub-atmospheric pressure to form a slurry composed of crystals of the composition $MgCl_2.4H_2O$ and the mother liquor thereof, and solidifying said slurry so as to form small particles.

3. The method of preparing hydrated magnesium chloride containing less water of crystallization than corresponds to the formula $MgCl_2.6H_2O$ which comprises concentrating a solution of magnesium chloride under sub-atmospheric pressure to form a slurry composed of crystals of $MgCl_2.4H_2O$ and the mother liquor thereof, solidifying said slurry so as to form small particles, drying such particles to remove water from the surfaces thereof and cooling the dried particles in a current of unheated air.

4. The method of preparing hydrated magnesium chloride containing less water of crystallization than corresponds to the formula $MgCl_2.6H_2O$ which comprises concentrating a solution of magnesium chloride by evaporation under sub-atmospheric pressure to saturation at a temperature of approximately 140° C., continuing evaporation until a slurry of crystals of $MgCl_2.4H_2O$ and mother liquor thereof is produced, solidifying such slurry in the form of small particles, drying such particles to remove water from the surfaces thereof and cooling the dried particles in a current of unheated air.

5. The method of preparing hydrated magnesium chloride containing less water of crystallization than corresponds to the formula $MgCl_2.6H_2O$ which comprises evaporating a magnesium chloride solution under sub-atmospheric pressure at a temperature of approximately 140° C. to form a slurry of crystals and mother liquor thereof, and flaking such slurry.

6. The method of preparing hydrated magnesium chloride containing less water of crystallization than corresponds to the formula $MgCl_2.6H_2O$ which comprises evaporating a magnesium chloride solution under sub-atmospheric pressure at a temperature of approximately 140° C. to form a slurry of crystals and mother liquor thereof, flaking such slurry, drying the flake particles to remove water from the surfaces thereof and cooling the dried particles in a current of unheated air.

Signed by me this 12 day of March, 1929.

SHELDON B. HEATH.